United States Patent Office 2,768,166
Patented Oct. 23, 1956

2,768,166

SUBSTITUTED GLYCINAMIDES

William F. Bruce, Havertown, and Joseph Seifter, Willow Grove, Pa., assignors, by mesne assignments, to American Home Products Corporation, New York, N. Y., a corporation of Delaware No Drawing. Application January 3, 1951,
Serial No. 204,266

6 Claims. (Cl. 260—247.2)

This invention relates to new substituted glycinamides having the general formula $$R_1R_2N-Y-CO-NHR_3$$

and more specifically by glycinamides having the formula $$R_1R_2NCH_2CONHR_3$$

It has been observed by some investigators that a limited number of glycinamide derivatives evidence some local anesthetic action although a systematic study of the pharmacological actions of substituted glycinamides had never been reported.

We have found in the preparation and a thorough study of a considerable number of new, substituted glycinamides that a number of these compounds evidence marked pharmacological actions hitherto unsuspected in the art and which we consider to be highly useful in the medicinal field. Specifically, we have found that when particular amines are used in the preparation of the compounds of our invention, the glycinamide products evidence useful pharmacological action, more specifically described below.

The new compounds of this invention have the general formula as indicated above where $R_1R_2N$ may be a radical selected from the class of nitrogen-containing heterocyclic radicals or a radical where $R_1$ and $R_2$ are alkyls; Y stands for a lower alkylene group and preferably —CH$_2$—, the first member of the group; while $R_3$ stands for an aralkyl radical with the alkyl portion being a lower alkyl either of the straight chain or branched chain type. Hydroxy and alkoxy substituted aralkyls are also contemplated.

When $R_1R_2N$ represents a nitrogen-containing heterocyclic radical, the latter may comprise a 5 or 6 membered ring. As examples of five membered rings contemplated by this invention may be mentioned a triazole, the reduced triazoles, pyrroline, pyrrolodine, imidazoline and imidazolidine. As examples of six membered rings contemplated by the invention are piperidine, morpholine and thiomorpholine. The 5 or 6 membered ring may have a benzene nucleus fused to the ring as for example, benzotriazole. It may contain in addition to nitrogen, oxygen or sulfur as part of the ring structure. Moreover, the alkyl, aralkyl oxy, hydroxy and alkoxy derivatives of the ring are also contemplated. The important limitation is that when $R_1R_2N$ represents the residue of a nitrogen-containing heterocyclic, the heterocyclic compound used to form the substituted glycinamide must be the equivalent of a secondary amine.

When $R_1R_2N$ represents a radical where $R_1$ and $R_2$ are alkyls, the latter may be of the straight-chain or branched-chain type but in any case alkyls of more than 9 carbon atoms are not contemplated since higher alkyls are difficult to evaluate pharmacologically due to solubility problems.

It is further within the scope of this invention that when $R_1$ and $R_2$ represent alkyl radicals that $R_1$ and $R_2$ may be similar or dissimilar radicals.

In general, the compounds of the invention may be synthesized by reacting an appropriate chloracetamide corresponding to the formula $$ClCH_2CONHR_3$$

where $R_3$ represents the radicals indicated above with an appropriate secondary amine corresponding to the formula $R_1R_2NH$, where $R_1R_2N$ represents the radicals as indicated above.

The amines may be prepared in the usual and known manner. The preferred method for the preparation of the chloracetamide intermediate involves reacting chloracetyl chloride with a primary amine $R_3NH_2$ in the presence of benzene or ether as a solvent for the reactants. Heating may or may not be necessary depending on the speed of the particular reaction. The chloracetamide remains in solution in the solvent and is obtained by distilling off the solvent under reduced pressure. In general, a molar ratio of chloride to amine of about 1:2 is preferred for the reaction.

The reaction of the appropriate chloracetamide and the appropriate secondary amine to form the desired substituted glycinamide is preferably operated with a molar ratio, amide to amine of about 1:1 and is carried out in the presence of a solvent for the reactants such higher alcohols having 4 to 7 carbon atoms in the molecule, dioxane or hydrocarbon solvents such as xylene. The reaction is carried out in the presence of an acid acceptor or mildly basic material such as alkali or alkaline earth metal carbonates, sodium bicarbonate or alkali metal alcoholates and preferably about 2 to 3 mols of this material is used. The reaction operation is set up for refluxing and the reaction temperature is the refluxing temperature of the particular solvent selected. Generally a reaction or refluxing time of about 10–15 hours is sufficient for complete reaction. In the event that solids are formed, these are removed by filtration, the substituted glycinamide product remaining in solution in the solvent. The latter is finally removed by distillation at low pressures to obtain the desired product.

The new compounds have valuable properties, being useful in the preparation of quaternary ammonium compounds, di-fatty acid amide, etc. Additionally they are often useful in that they possess at least one of the following pharmacological actions: local anesthetic, pressor, spasmolytic, analgesic, sedative and convulsant action.

It is known that certain amines possess a vasoconstrictor action and are identified as pressor amines. As an important feature of the invention it has been discovered that when pressor amines are used as intermediates in the preparation of the substituted glycinamides, the new products possess pronounced physiological actions. For example, while pressor amines themselves possess a certain amount of local anesthetic action, a surprising increase in anesthetic action has been found in corresponding glycinamide compounds and in some cases anesthetic combined with pressor action.

It has been discovered in the compounds of the invention having the formula $$R_1R_2NCH_2CONHR_3$$

that when the radical $R_1R_2N$— and/or —$NHR_3$ are the residues of secondary and primary pressor amines, respectively, a critically new physiological action is found that is unpredictably different from the physiological action of the pressor amines alone. It should be pointed out, however, that the use of pressor amines is not invariably necessary in order to obtain the substituted glycinamides of our invention having highly useful physiological properties.

Proceeding to a better understanding of the invention, illustrative specific procedures for the preparation of representative compounds falling within the general formula are set forth in the following examples.

EXAMPLE I

*Preparation of alpha-(N-methyl-N-2-heptylamino)-N-benzyl acetamide*

To 400 cc. of butanol contained in a one liter three neck flask, fitted with a mechanical stirrer, reflux condenser, and thermometer, was added 12.9 gms. of N-methyl-2-amino heptane, 18.3 gms. of chloro-acetobenzylamine and 50 gms. of sodium carbonate. The reaction mixture was heated at 100° C. overnight. It was filtered while hot to remove the inorganic salts. The salts were washed with n-butyl alcohol and the washings added to the filtrate. The filtrate was washed with sodium carbonate solution to remove any halogen which was determined by the Beilstein test. The filtrate was dried over magnesium sulfate and the alcohol distilled off under vacuum. The residue was also distilled under vacuum. B. P., 175–180° C. at .8 mm. N calculated, 10.14%; found, 9.75–9.97%.

In the same manner as indicated above, one may substitute other higher alkyl secondary amines such as the methyl or ethyl amyl, hexyl, octyl or nonyl amines for the methyl heptyl amine used in the specific example.

EXAMPLE II

*Preparation of alpha-diethylamino-N-(1-methyl-2-phenylethyl) acetamide*

For the preparation of the chloracetyl intermediate, a solution of 27 grams of amphetamine in 80 cc. of benzene was added in portions to a solution of 11.3 grams of chloracetyl chloride in benzene. Heat was evolved and the addition was done at a rate which kept the temperature between 50° and 60° C. On standing, solid amphetamine hydrochloride precipitated and was collected on a filter. This weighed 13.5 grams and melted at 149° C. The filtrate, after removal of the solvent in vacuo gave a yellow oil which solidified on standing. It weighed 26 grams and melted at 68° C. It was moderately soluble in cold ethanol and ethyl acetate and readily soluble in chloroform. It was crystallized from ethyl acetate with the addition of petroleum ether. The recrystallized product melted at 71–72° C. Analysis showed 6.0% N (calculated 6.6%) proving to be N-alpha-chloracetyl amphetamine. A sample on distillation boiled at 155–165° C. under a pressure of 3 mm.

A solution of 5 grams of N-alpha-chloracetyl amphetamine and 2 grams of diethyl amine in 20 cc. of n-butanol, together with 2 grams of sodium carbonate was refluxed for 12 hours. The solids were filtered off and the filtrate was concentrated in vacuo and distilled. The product, alpha-diethylamino-N-(1-methyl-2-phenylethyl) acetamide was a colorless oil boiling at 160–166° C. at a pressure of 4 mm. The yield was 5.4 grams.

EXAMPLE III

*Preparation of alpha-di-n-amylamino-N-1-methyl-2-phenylethyl acetamide*

To 200 cc. of n-butyl alcohol contained in a one liter flask equipped with a mechanical stirrer and reflux condenser were added 20 grams of di-n-amylamine-HCl, 22 grams of crude chloro-N-B-phenylisopropylacetamide and 40 grams of dry sodium carbonate.

The reaction mixture was refluxed overnight and then filtered to remove inorganic salts. The Beilstein test was negative, and the butanol was removed by distillation. The product was then fractionated. B. P., 194–6° C., at 1.3 mm.

EXAMPLE IV

*Preparation of alpha-piperidino-N-(1-methyl-2-phenylethyl) acetamide*

A solution of 5 grams of N-alpha-chloracetyl-dl-amphetamine (prepared as in Example II) and 2 grams of piperidine in 25 cc. of n-butanol together with 3 grams of sodium carbonate was refluxed for 12 hours. The solids were filtered off and the filtrate concentrated and distilled. The product was a viscous, colorless oil boiling at 175–185° C. at a pressure of 3 mm. The yield of alpha-piperidino-N-(1-methyl-2-phenylethyl) acetamide was 5.3 grams.

EXAMPLE V

*Preparation of alpha-piperidino-N-(2-phenylethyl) acetamide*

For the preparation of the chloracetyl intermediate, 30 grams of beta-phenylethylamine in 300 cc. of benzene was added slowly with stirring to a solution of 13.5 grams of chloracetyl chloride in 100 cc. of benzene. The reaction was rapid and after cooling beta-phenylethylamine hydrochloride was filtered off and the filtrate concentrated in vacuo and distilled. The product boiled at 160–166° C. at 3 mm. of pressure. The yield of N-alpha-chloracetyl-beta-phenylethyl amine was 20 grams.

A solution of 10 grams of N-alpha-chloracetyl-beta-phenylethyl amine and 4.3 grams of piperidine, together with 4.5 grams of sodium carbonate, in 25 cc. of n-butanol was refluxed for 12 hours. The organic layer was washed with water, whereupon the product crystallized and was collected on a filter. The product melted at 43–44° C. The yield of alpha-piperidino-N-(2-phenylethyl) acetamide was 6 grams.

EXAMPLE VI

*Preparation of alpha-(N-methyl-N-2-heptylamino)-N-diphenylmethyl acetamide*

To 150 cc. of n-butyl alcohol contained in a 500 cc. flask equipped with a mechanical stirrer and reflux condenser were added 13 grams of N-methyl-2-amino heptane, 25 grams of chloro-N-diphenylmethylacetamide and 30 grams of sodium carbonate.

The reaction mixture was refluxed overnight and then filtered to remove inorganic salts. The Beilstein test was negative and the butanol was removed by distillation. The product was fractionated. B. P., 220° C. at 1.9 mm.

EXAMPLE VII

*Preparation of alpha-(N-methyl-N-2-heptylamino)-N-1-methyl-2-phenylethyl acetamide*

To 500 cc. of n-butyl alcohol contained in a one liter three-neck flask fitted with a mechanical stirrer, reflux condenser, and thermometer were added 13 grams of N-methyl-2-amino heptane, 21 grams of chloro aceto Benzedrine, and 50 grams of sodium carbonate.

The reaction mixture was heated at 100° C. overnight. It was filtered hot to remove the inorganic salts. The salts were washed with n-butyl alcohol and the washings added to the filtrate. The filtrate was washed with sodium carbonate solution to remove any halogen which was determined by the Beilstein test. The alcohol was distilled off under vacuum. The residue was also distilled under vacuum. B. P., 175–177° C. at 0.6 mm.

EXAMPLE VIII

*Preparation of alpha-(N-methyl-N-2-heptylamino)-N-omega-phenyl tert.-butyl acetamide*

A solution of 67 grams of omega-phenyl-tertiary-butylamine in 500 cc. of toluene maintained at —20° C. was treated dropwise with 25 grams of chloracetyl chloride. The precipitated amine salt was filtered off and washed with toluene. The filtrate was concentrated in vacuo and the residue was distilled, boiling from 129–130° at 1 mm.

To 400 cc. of butanol contained in a one liter three-neck flask, fitted with a mechanical stirrer, reflux condenser and thermometer, was added 6.8 grams of N-methyl-2-amino heptane, 12 grams of chloro-N-omega-phenyl-tert.-butyl acetamide, and 50 grams of sodium carbonate. The reaction mixture was heated at 100° C. overnight. It was filtered while hot to remove the inorganic salts. The salts were washed with n-butyl alcohol and the washings added to the filtrate. The filtrate was washed with sodium carbonate solution to remove any halogen which was determined by the Beilstein test. The filtrate was dried over magnesium sulfate and the alcohol distilled off under vacuum. The residue was also distilled under vacuum. B. P., 153–159° C. at .2 mm.

EXAMPLE IX

*Preparation of alpha-morpholino-N-diphenylmethyl acetamide*

To 400 cc. of butanol contained in a one liter three-neck flask, fitted with a mechanical stirrer, reflux condenser and thermometer, was added 8.7 grams of morpholine, 26 grams of chloro-N-diphenylmethyl acetamide and 50 grams of sodium carbonate. The reaction mixture was heated at 100° C. overnight. It was filtered hot to remove the inorganic salts. The salts were washed with butanol and the washings added to the filtrate. The filtrate was washed with sodium carbonate solution to remove any halogen, which was determined by the Beilstein test. The filtrate was dried over magnesium sulfate and the alcohol distilled off under vacuum. The residue solidified and was recrystallized from n-hexane. M. P., 93–94° C.

EXAMPLE X

*Preparation of alpha-7-theophylline-N-diphenylmethyl acetamide*

To 400 cc. of n-butyl alcohol contained in a one liter flask, fitted with a mechanical stirrer and reflux condenser, were added 20 grams of theophylline, 25 grams of chloro-N-diphenylmethyl-acetamide and 50 grams of sodium carbonate. The reaction mixture was refluxed overnight. It was filtered hot. The solid was washed with water to remove the inorganic salts. It was then washed with ether and dried. M. P., 290–291° C. Analysis: N, calculated 17.36; found 17.17; 16.90.

EXAMPLE XI

*Preparation of alpha-pyrryl-N-1-methyl-2-phenylethyl acetamide*

To 200 cc. of liquid ammonia and 0.3 grams of ferric chloride contained in a one liter three-neck flask, fitted with a mechanical stirrer, Dry-Ice condenser and a stopper, was added 5.8 grams of sodium in small pieces. When the sodium dissolved, 200 cc. of toluene was added and the Dry-Ice condenser replaced with a reflux condenser. The ammonia was evaporated off on a steam bath. While the reaction flask was still on the bath, 18 grams of pyrrole dissolved in 25 cc. of toluene was added through a dropping funnel. It was heated until no ammonia was given off. Then 52.8 grams of chloro-N-1-methyl-2-phenethyl acetamide dissolved in 150 cc. of toluene was added and the mixture heated for 2 hours. It was then cooled, filtered and the toluene distilled off under vacuum. The residue solidified. It was recrystallized from ethanol. M. P., 134–135° C.

EXAMPLE XII

*Preparation of alpha-pyrrolidino-N-1-methyl-2-phenylethyl acetamide*

To 150 cc. of n-butyl alcohol contained in a 300 cc. three-neck flask, fitted with a mechanical stirrer, reflux condenser, and a thermometer, was added 5.6 grams of pyrrolidine, 19 grams of chloro-N-1-methyl-2-phenylethyl acetamide and 20 grams of sodium carbonate. The reaction mixture was heated at 100° C. overnight. It was filtered hot to remove the inorganic salts. The salts were washed with sodium carbonate solution until no halogen was present, which was determined by the Beilstein test. The filtrate was dried over magnesium sulfate and the alcohol distilled off under vacuum. The product was fractionated. B. P., 168–169° C. at 0.8 mm.

EXAMPLE XIII

*Preparation of 3-methyl-1,2,3,4-tetrahydro-2-isoquinilino-N-2-phenylisopropyl acetamide*

To 400 cc. of butanol contained in a one liter, three-neck flask, fitted with a mechanical stirrer, reflux condenser, and thermometer was added 15 grams of 3-methyl-1,2,3,4-tetrahydroisoquinoline, 22 grams of chloro aceto benzedrine, and 50 grams of sodium carbonate. The reaction mixture was heated at 100° overnight. It was filtered hot to remove the inorganic salts. The salts were washed with butanol and the washings added to the filtrate. The filtrate was washed with sodium hydroxide solution to remove any halogen which was determined by the Beilstein test. The filtrate was dried over magnesium sulfate and the alcohol distilled off under vacuum. The residue was then fractionated. B. P., 197–203° C. at 0.5 mm.

EXAMPLE XIV

*Preparation of piperidino-N-beta-(3,4-dimethoxyphenyl)ethyl acetamide*

To 45.25 grams of beta-(3,4-dimethoxyphenyl)ethyl amine dissolved in 150 cc. of toluene was added 17 grams of pyridine. To this solution, at −20° C. was added 27.87 grams of chloracetyl chloride, with stirring. After warming to room temperature the solution was washed with water. The chloro-N-beta-(3,4-dimethoxyphenyl)ethyl acetamide crystallized from the toluene layer. It was recrystallized from benzene and hexane. M. P. 92–95° C.

To 400 cc. of amyl alcohol contained in a one liter, three-neck flask, fited with a mechanical stirrer, reflux condenser, and thermometer was added 12.8 grams of chloro-N-(beta-(3,4-dimethoxy-phenyl)ethyl acetamide); 4.2 grams of piperidine and 40 grams of sodium carbonate. The reaction mixture was heated at 100° overnight. It was filtered hot to remove the inorganic salts. The salts were washed with amyl alcohol and the washings added to the filtrate. The filtrate was washed with sodium hydroxide solution to remove any halogen which was determined by the Beilstein test. The filtrate was dried over magnesium sulfate and the alcohol distilled off under vacuum. The residue was also distilled under vacuum, and the distillate solidified. It was recrystallized from n-hexane and dried in a desiccator over paraffin shavings. B. P., 206–215° C. at 0.36 mm. M. P. 75–77° C.

By procedures analogous to those described in the above examples, the appropriate secondary amine $R_1R_2NH$ and the appropriate chloracetamide corresponding to the formula

$$ClCH_2CONHR_3$$

where $R_1$, $R_2$ and $R_3$ represent radicals as indicated above, can be reacted to form the following substituted glycinamides representative of those comprehended in this invention.

1. Alpha - (N - methyl - N - 1 - methylbutylamino) - N-1-methyl-2-phenylethyl acetamide.
2. Alpha - (N - methyl - N - 1 - methylbutylamino) - N-2-phenylethyl acetamide.
3. Alpha-diethylamino-N-2-phenylethyl acetamide.
4. Alpha - piperidino - N - 2 - p,m,m' - trimethoxyphenylethyl acetamide.
5. Alpha - diethylamino - N - (2 - hydroxy - 1 - methyl-2-p,m-dihydroxyphenylethyl) acetamide.
6. Alpha-morpholino-N-3-hydroxy-3-phenylpropyl acetamide.

Substantially all of the products of the invention are high boiling basic liquids of limited solubility. It is contemplated that while the products may be used in their basic form, it is within the scope of this invention that they may be prepared and used in the form of their acid-addition salts. The preparation of such a salt is well-known and generally involves the addition of the selected acid to an ether, alcohol or water solution of the basic product. The acid is chosen to yield a salt which is known to those skilled in the art as being physiologically non-toxic. As examples, the hydrochloride, sulfate or tartrate salts of the new products may be used.

It is further contemplated that those substituted glycinamides, or the non-toxic salts thereof, which are less soluble in dilute acid than 0.5% by weight may be brought into satisfactory solution by the use of solubilizing, surface-active, emulsifying or detergent agents in order to obtain a more complete physiological effect of the specific glycinamide product. Lipoid solvents having a physiologically non-toxic effect such as long-chain fatty acid partial esters of hexitol anhydrides or oxy-alkylene derivatives thereof, vegetable and animal oils and ointment bases such as petroleum jelly or cholesterol are examples of solvents that are considered useful in admixture with the substituted glycinamides for obtaining enhanced physiological effect.

Many modifications of the invention will be apparent to those skilled in the art without departure therefrom or from the scope of the claims, and since the foregoing disclosure has been given by way of example for clearness and understanding only, no unnecessary limitations should be understood and the appended claims should be construed as broadly as the state of the art permits.

This application is a continuation-in-part of application Serial No. 673,155, filed May 29, 1946, now Patent No. 2,548,863.

We claim as our invention:

1. A compound selected from the group consisting of a glycinamide having the formula

B—CH₂—CO—NHR₃ wherein B is a di-(lower alkyl)amino group attached to the methylene radical through its nitrogen atom and wherein the alkyl groups may be joined to form a member of the group consisting of piperidine, morpholine, and 3-methyl-1,2,3,4-tetrahydroisoquinoline, and R₃ is a member of the group consisting of phenyl-lower alkyl and diphenylmethyl radicals, and the non-toxic acid-addition salts thereof.

2. The compound, α-(N-methyl-N-2-heptylamino)-N-1-methyl-2-phenylethyl acetamide.

3. The compound, α-(3-methyl-1,2,3,4-tetrahydro-2-isoquinolino)-N-2-phenylisopropyl acetamide.

4. The compound, α-piperidino-N-1-methyl-2-phenylethyl acetamide.

5. The compound, α-piperidino-N-2-phenylethyl acetamide.

6. The compound, α-morpholino-N-diphenylmethyl acetamide.

References Cited in the file of this patent

UNITED STATES PATENTS

| | | |
|---|---|---|
| 2,139,190 | Iselin et al. | Dec. 6, 1938 |
| 2,153,707 | Becherer et al. | Apr. 11, 1939 |
| 2,293,655 | Hentrich et al. | Sept. 15, 1942 |
| 2,356,587 | Hentrich et al. | Aug. 22, 1944 |
| 2,520,153 | Lawson et al. | Aug. 29, 1950 |

FOREIGN PATENTS

| | | |
|---|---|---|
| 210,985 | Switzerland | Nov. 1, 1940 |
| 534,129 | Great Britain | Feb. 27, 1941 |